United States Patent
Pavan et al.

(10) Patent No.: US 8,997,023 B2
(45) Date of Patent: Mar. 31, 2015

(54) RAPID MANIPULATION OF FLOWSHEET CONFIGURATIONS

(75) Inventors: David John Pavan, Calgary (CA); Samuel Grosvenor Norris, Victoria (CA)

(73) Assignee: Honeywell ASCA Inc., Mississauga, Ontario (CA)

( * ) Notice: Subject to any disclaimer, the term of this patent is extended or adjusted under 35 U.S.C. 154(b) by 606 days.

(21) Appl. No.: 12/837,159

(22) Filed: Jul. 15, 2010

(65) Prior Publication Data

US 2011/0047516 A1    Feb. 24, 2011

Related U.S. Application Data

(60) Provisional application No. 61/234,890, filed on Aug. 18, 2009.

(51) Int. Cl.
G06F 3/048    (2013.01)
G06Q 10/06    (2012.01)

(52) U.S. Cl.
CPC ...... G06Q 10/06 (2013.01); *G05B 2219/31342* (2013.01)
USPC .......................................................... 715/853

(58) Field of Classification Search
USPC .......................................................... 715/853
See application file for complete search history.

(56) References Cited

U.S. PATENT DOCUMENTS

| | | | |
|---|---|---|---|
| 5,533,110 A * | 7/1996 | Pinard et al. | 379/355.01 |
| 6,323,882 B1 | 11/2001 | Jerome et al. | |
| 6,442,515 B1 * | 8/2002 | Varma et al. | 703/22 |
| 2006/0136870 A1 * | 6/2006 | Wilson et al. | 717/109 |
| 2008/0101258 A1 * | 5/2008 | Cheng | 370/254 |
| 2009/0031257 A1 * | 1/2009 | Arneson et al. | 715/862 |
| 2009/0228786 A1 * | 9/2009 | Danton et al. | 715/243 |

* cited by examiner

*Primary Examiner* — Boris Pesin
*Assistant Examiner* — Angie Badawi
(74) *Attorney, Agent, or Firm* — Jetter & Associates, P.A.

(57) ABSTRACT

A user initiated move action can be detected on a selected graphical object on a flowsheet within a rendered canvas of a graphical user interface. During the user initiated move action, based a predetermined threshold distance between the selected graphical object and the other graphical objects, candidate graphical objects are identified from the other graphical objects. Provided at least one candidate graphical object is identified, at least one proposed connection is visually presented between the selected graphical object and the candidate graphical object in a contrasting visual style to a style for established interconnections between the plurality of graphical objects within the rendered canvas. Upon the user confirming the proposed connection, a new established connection is visually presented in a canvas final state to replace the proposed connection using the style for established interconnections within the rendered canvas between the selected graphical object and the candidate graphical object.

9 Claims, 4 Drawing Sheets

RAPID MANIPULATION OF FLOWSHEET CONFIGURATIONS

CROSS REFERENCE TO RELATED APPLICATIONS

This application and the subject matter disclosed herein claims the benefit of Provisional Application Ser. No. 61/234,890 entitled "RAPID MANIPULATION OF GRAPHICAL REPRESENTATIONS OF PROCESS FLOW DIAGRAM MODELS", filed Aug. 18, 2009, which is herein incorporated by reference in its entirety.

FIELD

Disclosed embodiments relate to manipulation of flowsheet configurations.

BACKGROUND

Process modeling systems have been used in process industries such as refining and pharmaceutical manufacturing for a variety of purposes. Process engineers use these systems to design and evaluate new processes, redesign, retrofit and/or optimize existing process plants. For example, process modeling system may be used in different application modes such as simulation, data reconciliation, and optimization. Computer simulations of processes involving the movement, separation, and/or transformation of materials commonly employ a visual representation of the process, in whole or in part.

This visualization is better suited to human understanding of the process being simulated than the raw underlying data. Computer graphics rendering of this visualization is generally termed a flowsheet model or simply a "flowsheet" and roughly corresponds to a Process Flow Diagram (PFD), depending on the level of detail required for the process model. This form of flowsheet visualization is a nearly universal feature of process simulation software. The flowsheet once assembled/built typically includes a plurality of individual graphical elements (or objects) that may be represented as icons and lines which correspond to process semantics and the relationships of the process objects. Process elements may be either process or non-process elements. A process element is an item of operating hardware, such as a pump, mixer, reactor or heat exchanger. A non-process element is something other than an item of operating hardware, typically a passive device such as a flow meter, thermocouple or pressure gauge. For instance, line direction in a flowsheet can be represented with an arrow which can indicate the fluid flow direction in a process.

Software implementations of a flowsheet typically present graphical 'handles' on the objects where lines can connect to them. To create these connections it is often necessary to drag a line from a connection handle on one object and drop onto a connection handle of a different object. While the connection operation is simple to perform, the operation can quickly become repetitious and tedious when creating a complex flowsheet.

Furthermore, deleting a line requires different user actions (e.g. select-delete) as compared to creating a line (e.g. select drag-drop), and changing a line requires both user actions combined (e.g., select select-delete followed by drag-drop). While these conventions are common and therefore generally easy to learn, they are time consuming when making frequent changes, such as early in a process design when the topology of the process is being assembled and is prone to frequent changes.

The traditional technique of dragging connections lines between icons on a computer-rendered graphical flowsheet is intuitive but complex for all but the simplest action of connecting a single line to a free (e.g., unconnected) handle on a second icon. Consider the scenario of inserting a new object into the middle of an existing line. Using the traditional technique of dragging connections lines requires selecting the object and deleting it, then adding the new object to the flowsheet, followed by dragging and dropping two new connections from the original object to the new object. The single conceptual action of insertion entails four discrete user actions. The necessary effort required to insert a new object into the middle of an existing line is compounded when the object being inserted mid-connection has multiple input and/or output connections. Furthermore, the user temporarily loses the visual context of the original process line once it is deleted, potentially leading to confusion when eventually reconnecting to the original process icons.

SUMMARY

Disclosed embodiments describe new techniques and systems that permit rapid manipulation of flowsheet configurations that address the problems of overhead and complexity for conventional drag-and-drop to connect process icons on a flowsheet as described above. Significantly, disclosed embodiments allow a user to drag icons to create new connections rather than dragging a line in conventional approaches.

A user initiated move action can be detected on a graphical object on a flowsheet within a rendered canvas of a graphical user interface. During the user initiated move action, based a predetermined threshold distance between the selected graphical object and the other graphical objects, candidate graphical objects from the other graphical objects are identified. Provided at least one candidate graphical object is identified during the identifying, at least one proposed connection is visually presented between the selected graphical object and the candidate graphical object in a contrasting visual style to a style for established interconnections between the plurality of graphical objects within the rendered canvas. Upon the user confirming the proposed connection, a new established connection is visually presented to replace the proposed connection using the style for established interconnections within the rendered canvas between the selected graphical object and the candidate graphical object.

DETAILED DESCRIPTION

Figure 1:
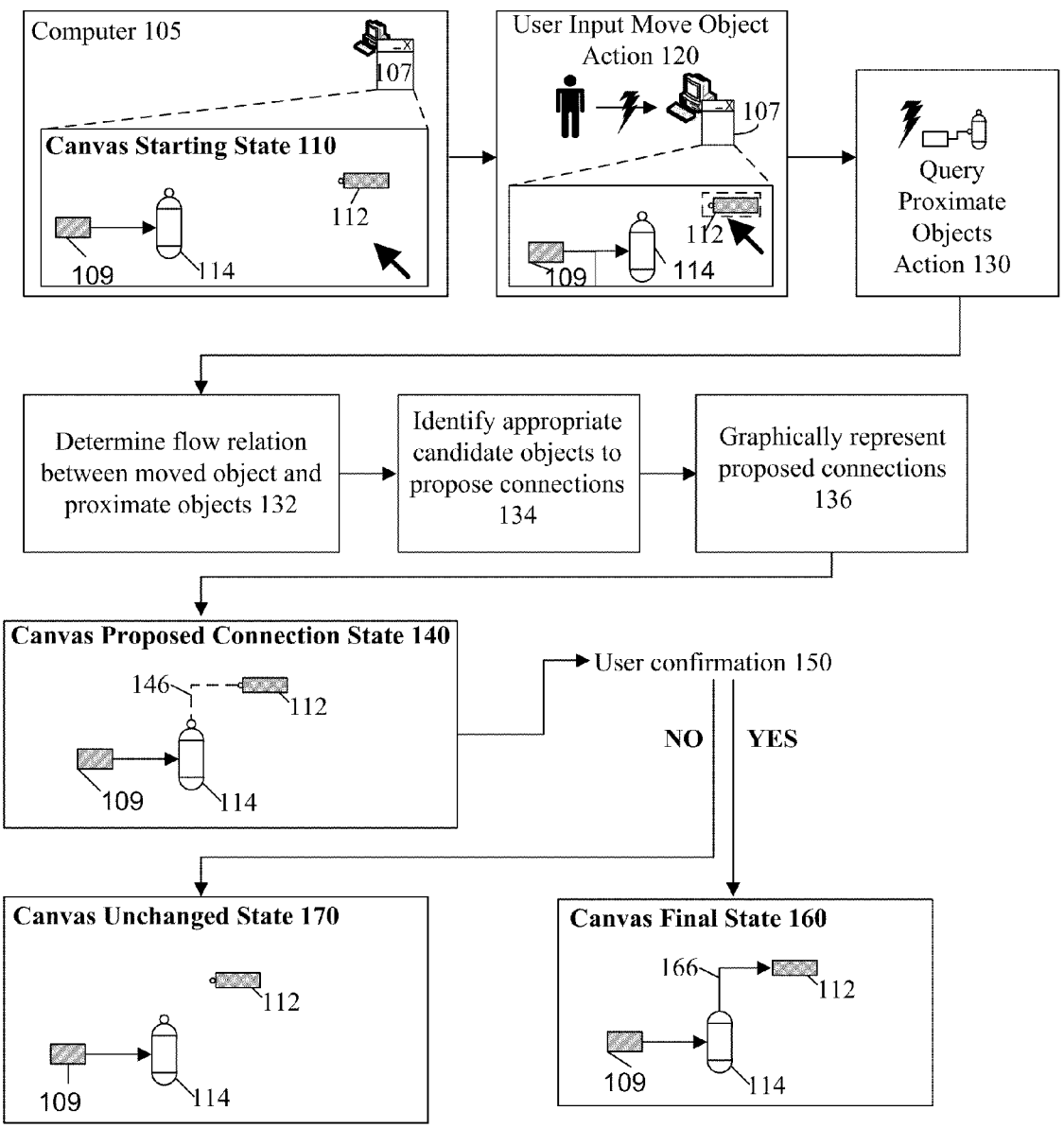
FIG. 1 is a schematic diagram illustrating a flow for rapid manipulation of graphical representations of flowsheet models, according to an embodiment of the invention.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

This Disclosure provides solutions for rapid manipulation of graphical representations for computer-rendered graphical flowsheets by making connections by moving icons that represent elements rather than the conventional technique of dragging connections lines between icons. The flowsheet is generally represented within a canvas of a graphical user interface (GUI). Graphical objects within the GUI can represent flowsheet elements (e.g., pumps, mixers, reactors, heat exchangers) which can be connected together to create a flow having a distinct input, output, and flow direction congruent with a flowsheet model which can be represented by graphical lines connecting two or more objects. User manipulation actions (e.g. moving a graphical object represented as an icon) can trigger automatically determined proposed connections which represent the highest ranked proposed connection (s) to be presented within the GUI to the user.

The proposed connection(s) can be a flow connection between one or more objects. For example, when a graphical object is moved by a user to a location proximate to another graphical object, a proposed connection represented by a contrasting visual style, such as a dashed line, connecting the icons can be displayed. The proposed connections can algorithmically generated based on the position of the icon being moved relative to other icons (e.g. based on a threshold distance), as well as information about the particular graphical objects being moved and information about the other icons, such as based on compatibility between the corresponding objects. For instance, if connecting a proximate graphical object to another object would render the flowsheet model unusable, then this would not be displayed as a proposed connection. An example of a unusable connection would be between incompatible connection types, such as between electrical wire and a fluid connector such as a pipeline. The proposed connection can be finalized into an established connection through an active user action such as a keypress or by the conclusion of a move (e.g. drag and drop) action.

FIG. 1 is a schematic diagram illustrating an exemplary flow 100 for rapid manipulation of computer-rendered graphical flowsheets according to an embodiment of the invention. As described above, the flowsheet is a visual representation of a process, in whole or in part, that roughly corresponds to a PFD, and is a simplified representation of the process that can utilize a connection style such as solid lines to represent information and/or physical material traveling through the process which connect objects which perform process operations such as separation, mixing, chemical conversion, and the like. The flowsheet is rendered on an interactive display allowing a computer user to change the specifications (referred to herein as the topology) of the simulation model, including the relative position of objects and the lines connecting them. Modifying the topology of a process simulation can be accomplished visually with a flowsheet by adding, removing, and/or changing objects and lines.

Each element of the simulation model can be graphically represented in the rendered flowsheet by an object having a pictorial representation (e.g., an icon). For instance, a heat exchanger can be represented by an icon having a circular shape with an arrow indicating the heat exchange direction. Each object corresponding to an element in the flowsheet can have one or more handles. The handles permit connection(s) to be established between two or more objects. These connections correlate to the relationships between the elements in the flowsheet. For instance, one handle can represent an input of an element, while another handle can represent an output of an element.

As described above, traditional flowsheet manipulation techniques require users to connect graphical objects by manually drawing a line between the connection handles of the graphical objects desired to be connected. As noted above, disclosed embodiments instead allow a user to move the objects (e.g. icons) rather than the lines to create connections and perform compound actions. For instance, inserting an object into an existing line can be performed by a simple object move action. Disclosed embodiments thus can significantly reduce the user time and effort in terms of discrete mouse and keyboard actions required to assemble and/or modify the topology of the simulation model. Furthermore, the opportunity for user error is reduced during complex actions (e.g., mid-connection insertion) because the connections being superseded can remain visible and apparent to the user until the action is completed.

In canvas starting state 110, a computer 105 having software able to render a flowsheet renders the flowsheet within a graphical canvas 107. Canvas 107 can conform to one or more coordinate systems, such as pixel-based, permitting discrete user movements to be determined in real-time. As used herein, real-time includes near real-time (e.g., a delay based on the data processing time). In one embodiment, canvas 107 can utilize a Cartesian coordinate system which can permit discrete object movements to be determined, and generation and presentation of proposed connection(s) can be triggered. The starting state 110 can include a plurality of objects 109, 112, 114, where objects 109 and 112 are connected to one another and objects 112 and 114 are initially unconnected to one another and separated by a distance on the canvas 107. The user can initiate a user input move object action 120. To move object 112, for example, a user can select the object 112 which can cause the object 112 to focus (i.e. a rendering format to indicate selection) within the canvas 107. In one particular embodiment a bounding rectangle can be shown around the focused icon(s).

The action 120 can be performed by one or more input mechanisms. Input mechanisms can include, but are not limited to, pointing devices (e.g., mouse), keyboard, touch screens, touchpad, stylus-driven tablet, and the like. The move action 120 by a user can cause object 112 to be moved proximate to object 114. For example, as shown, user input move object action 120 resulted in object 112 being dragged closer to object 114. The move action 120 can trigger query proximate objects action 130 to be performed.

In query proximate objects action 130, distance calculations can be performed and compared to a predetermined (e.g., user specified) threshold distance to determine objects proximate to the object being moved. Distance calculations include utilizing formulas which can include, but are not limited to, a Euclidean distance formula, and the Pythagorean Theorem. The query proximate objects action 130 can be performed in real-time as a user moves an object in canvas 107. As such, query proximate objects action 130 can be performed for each graphical render update in canvas 107. Assuming at least one proximate object is identified, a flow relation between the moved object 114 and the proximate object(s) can be determined, as shown in block 132. Flow relation can include, but is not limited to, object inputs, outputs, flow direction, flow rate, and the like. For example, an object input can be mated to a proximate object output. In block 134, appropriate candidate objects can be identified and proposed connections thereto can be generated. Although one-to-one object proposed connections are generally presented herein, multiple proposed connections such as one-to-many and many-to-many connections are contemplated herein.

A single proposed connection can be presented for the object closest to the object having focus (e.g. object being moved). In another embodiment, proposed connections for an object can be selected based on object function. For instance, when the calculation of candidate connections between a selected object exceeds the maximum threshold distance then the connection is considered to be unlikely and no candidate is displayed for that object. This ensures that only likely connections are proffered and the user is not overwhelmed with unlikely visual options. Besides or in conjunction with proximity, candidate objects can be identified using model data and/or semantics. For instance, objects with similar flow rates can be identified and selected as candidate objects.

The generated proposed connection(s) can be graphically presented, as shown in block 136. Proposed connections can be simultaneously presented on the canvas 107. When multiple candidate objects are determined multiple proposed connections can be generated and presented. In one embodiment, when multiple proposed connections exist, the proposed connections can be ranked (e.g., on the basis of distance, with the shortest distance being the highest ranked) and only the highest ranking proposed connection can be presented. In this embodiment, the highest ranked proposed connection in a contrasting visual style to existing connections can be used in order to distinguish it for the user. For instance, when a proposed connection can result in improved process flow over other connections, the proposed connection can be presented only for the candidate object. In another embodiment, multiple proposed connections can be presented simultaneously, each with a unique visual style.

Actions 130-136 can be performed actively during the user input move object action 120. Actions 130-136 can occur in real-time as the user repositions an object, such as object 112, on canvas 107. As such, proposed connections can be automatically calculated, generated, and rendered on the canvas 107 in real-time.

In canvas proposed connection state 140, proposed connection(s) 146 connecting object 112, 114 via object connection handles (shown as small circles) can be presented on the canvas 107. In one embodiment, although not shown, the proposed connection 146 can be illustrated using a dashed line connecting two or more objects using the shortest distance (e.g., diagonal line). A particular advantage of using a line implementing the shortest distance is because shorter lines can aid the human eye in visualizing the flow of material and information through the flowsheet. Additionally shorter lines reflect the physical reality of minimizing pipe lengths in the processing facility that a the flowsheet can represent. In another embodiment, as shown in FIG. 1, the proposed connection 146 can be rendered using two or more orthogonal lines.

In user confirmation action 150, user confirmation can be received from one or more input mechanisms (e.g., devices) associated with the computer 105. For example, a keyboard shortcut command from the user can be used to accept a presented proposed connection 146.

If the user confirmation 150 action is rejected (shown in FIG. 1 as "NO"), the canvas unchanged state 170 can be presented. In state 170, the canvas can update the location of the object 112 to the new user designated location. If the user confirmation 150 action is accepted (shown in FIG. 1 as "YES"), the canvas final state 160 can occur. In state 160, the proposed connection 146 can be established and connection 166 shown as an exemplary solid line can be rendered.

It should be noted that the traditional flowsheet technique of dragging lines between connection handles on objects is not precluded by this Disclosure. The traditional technique can still be supported permitting the connecting of secluded objects and/or making connections in a relatively crowded locale. In one embodiment, an object can be repositioned without changing the object connections. In this embodiment, an input device can be used to suppress the proximity checking and the proposed connection feature.

Figure 2:
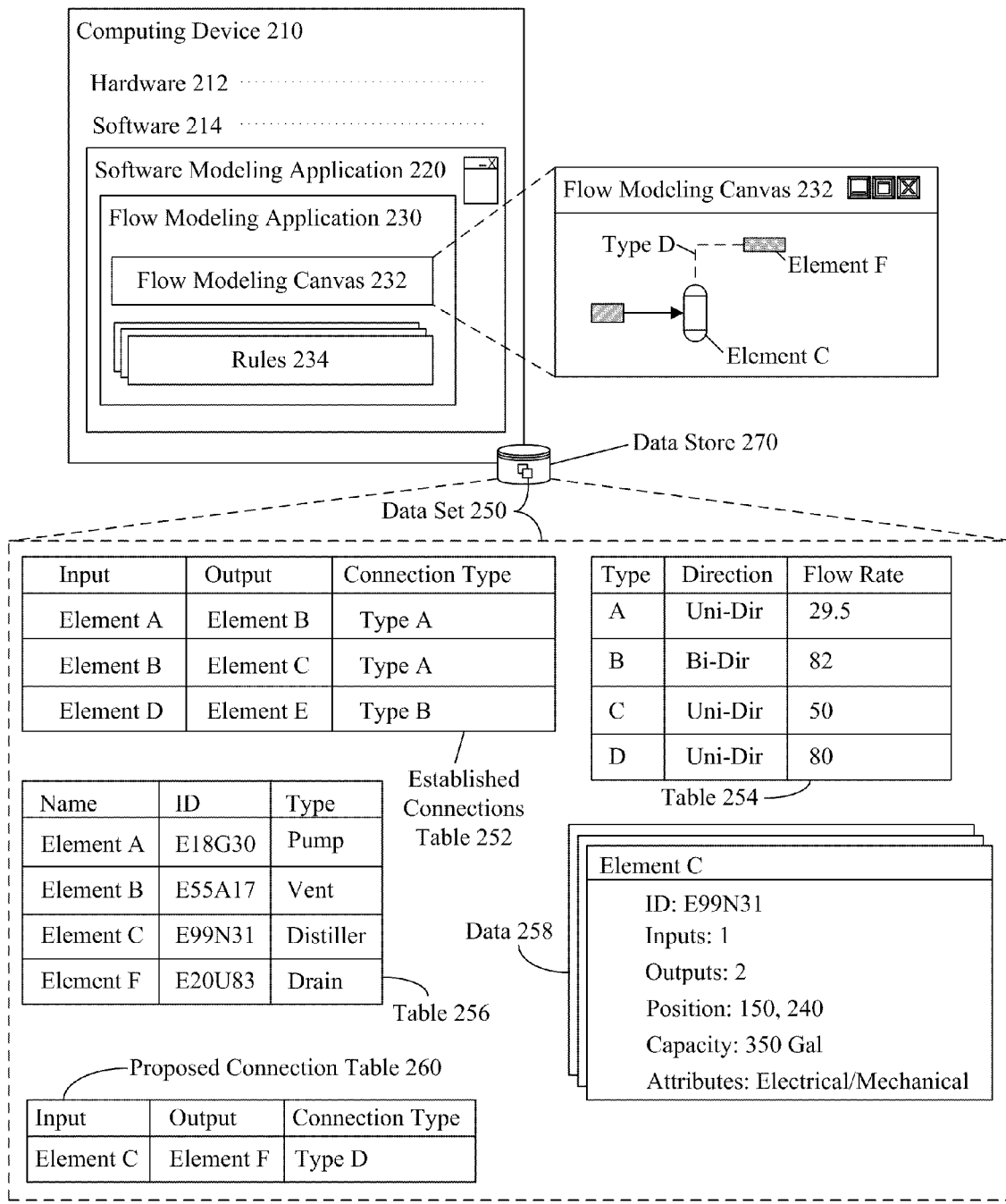
FIG. 2 is a schematic diagram illustrating an exemplary system providing rapid manipulation of graphical representations of flowsheet models, according to an embodiment of the invention.

FIG. 2 is a schematic diagram illustrating an exemplary system 200 that provides rapid manipulation of connections for computer-rendered graphical flowsheets, according to an embodiment of the invention. In system 200, a computing device 210 comprising hardware 212 and software 214 can execute software modeling application 220. Application 220 can be associated with flow modeling (i.e., simulation) application 230. In one embodiment, application 230 can be a flow/process modeling application in a suite of modeling applications.

As used herein, elements of a flowsheet can be graphically presented within flow modeling canvas 232 as graphical objects. For instance, element F and element C can be presented as graphical icons within canvas 232. The graphical objects can be associated with elements of the flow model. Element information can be stored in data store 270 as data set 250.

In one embodiment, application 230 can be a HONEYWELL UNISIM™ application. In this embodiment, data set 250 can be used to simulate flow models rendered in flow modeling canvas 232. In another embodiment, application 230 can be a component of an integrated development environment (IDE) tool (e.g., software modeling application 220).

In exemplary system 200, application 230 can maintain a list of proposed connections which have been generated that are presentable to the user. For example, a proposed connection of Type D can be presented to a user moving an element F proximate to an element C. In one embodiment, a proposed connections table 260 can be temporarily populated to store proposed connections which have not yet been user approved. This permits multiple proposed connections to be generated and tracked when multiple proposed connections exist. For instance, moving a group of objects proximate to another group of objects can result in a plurality of proposed connections being determined, generated, and presented. When a connection is user approved, the connection can be added to the established connections table 252.

Proposed connections table 260 can be populated with proposed connections using rules 234, tables 252-256, and data 258 which provides data for the respective elements. After an object is determined to be proximate (e.g., within a predetermined threshold distance), table 256 and data 258 can be utilized to identify compatibility with the selected object being moved (e.g., the object with focus). For instance, table 256 can be used to identify compatible element types to determine whether objects can be connected.

Once suitable elements are determined, appropriate proposed connection types can be determined using data in table 254 and data 258. In one embodiment, input and/or output quantities can be used to programmatically select appropriate proposed connections between proximate objects. In this embodiment, additional properties including, but not limited to, capacity, volume, flow rate, temperature, and the like, can be used to determine proposed connections.

Rules 234 can be utilized to determine when proposed connections can be generated for proximate objects. Rules 234 for which objects can be connected can include thresholds for flow rates, quantities of inputs/outputs, flow direction, and the like. Rules 234 can be user configured through one or more configuration interfaces associated with application 230. In one embodiment, rules 234 can be automatically generated using semantic data from existing process flow diagrams and/or simulation models.

Data set 250 can be a stored within a relational database, binary file, text file, and the like. Data store 270 can be associated with computing device 210, distributed file system, and the like.

Figure 3:
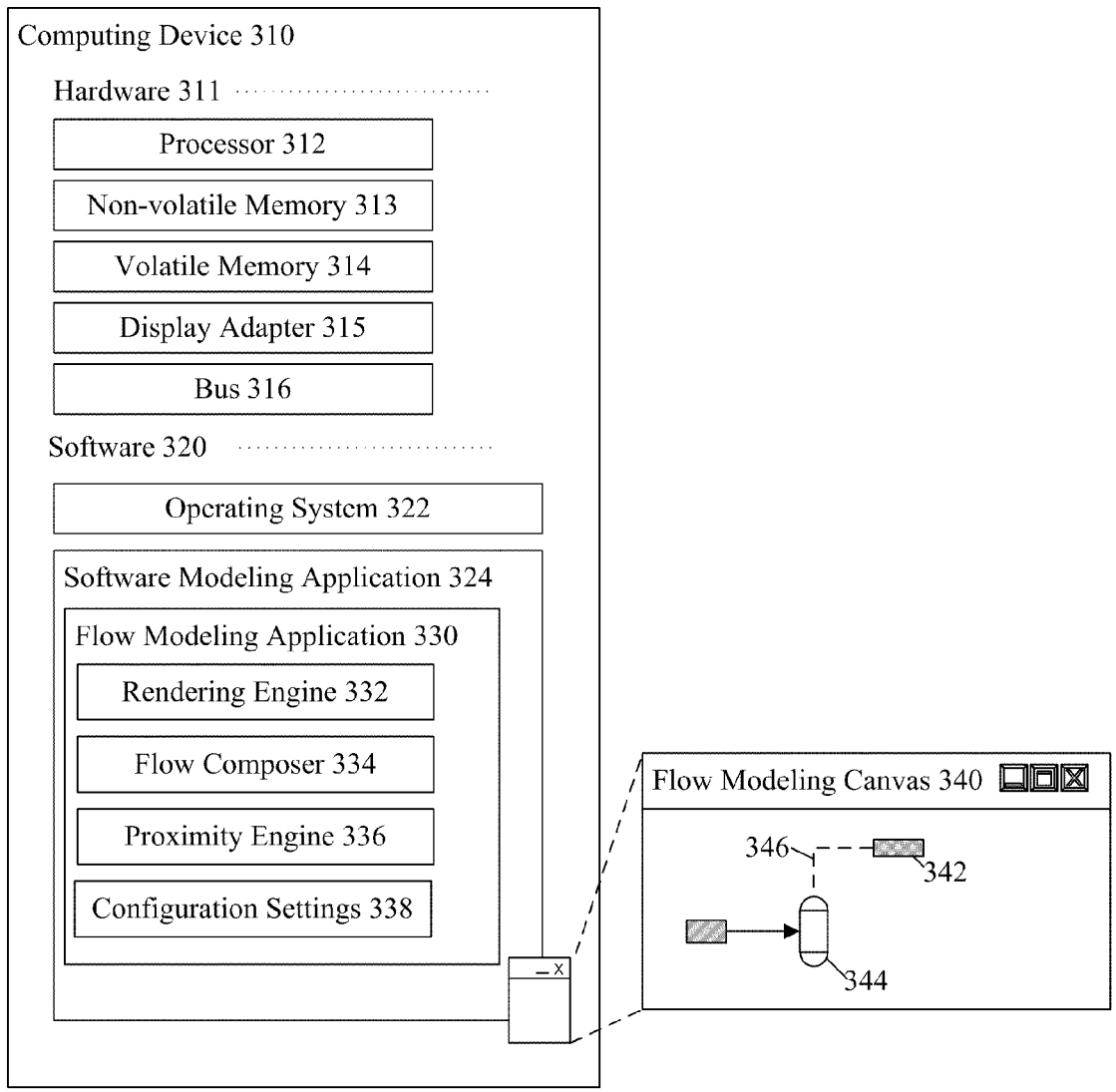
FIG. 3 is a schematic diagram illustrating a system for rapid manipulation of graphical representations of flowsheet models, according to an embodiment of the invention.

FIG. 3 is a schematic diagram illustrating a system 300 for rapid manipulation of connections for computer-rendered graphical flowsheets in accordance with an embodiment of the invention. System 300 can be a distributed computing environment, networked computing environment, cloud computing environment, and the like. In system 300, a computing device 310 can execute a software modeling application 324 which is able to automatically propose connections for graphical objects within a flow modeling canvas 340.

As used herein, computing device 310 can be a hardware/software entity comprised of hardware 311 and software 320. Hardware 311 can include, but is not limited to, processor 312, non-volatile memory 313, volatile memory 314, display adapter 315, and bus 316. Processor 312 can execute operations necessary for software modeling application 324 to present real-time visualization of graphical objects on canvas 340. Display adapter 315 can be utilized to graphically present objects on canvas 340 and visually present proposed connections 346. Software 320 can include, but is not limited to, operating system 322 and software modeling application 324. In one embodiment, software modeling application 324 can execute within operating system 332. In another embodiment, software modeling application 324 can execute on a remotely located computing environment which can be associated with computing device 310.

Software modeling application 324 can be a software entity enabling flow process models to be visually presented and manipulated by a user in real-time. Application 324 can include flow modeling application 330 which can allow proposed connections for graphical objects to be visually presented during object manipulation. For instance, a user moving object 342 proximate to object 344 can be presented with proposed connection 346 in real-time within canvas 340.

In one embodiment, flow modeling application 330 can be a plug-in component of software modeling application 324. In another embodiment, flow modeling application 330 can be an integrated feature of software modeling application 324 which can be selectively enabled by a user. Flow modeling application 330 functionality can be enabled through configuration options, keyboard shortcut commands, and the like.

Rendering engine 332 can be a component configured to dynamically render graphical objects, established connections, and proposed connections within canvas 340. Engine 332 can render proposed connections 346 as an object and/or group of objects are moved within the canvas 340. In one embodiment engine 332 can render proposed connections in real-time or near real-time. For instance, as object 342 is moved proximate to object 344, proposed connection 346 can visually connect object 342 to object 344 which can be continuously rendered until the move is completed. Engine 332 can be a component of application 330, application 324, operating system 322, and the like.

Proposed connections can be determined in real-time by flow composer 334 utilizing rules 234. Composer 334 can calculate connection paths between objects in focus (e.g., object being moved) and proximate objects on canvas 340. Composer 334 can be configured to derive optimum paths between proximate objects. In one embodiment, composer 334 can be configured to determine an optimum orthogonal path between proximate objects. Alternatively, composer 334 can be configured to determine an optimum path (e.g. utilizing diagonal lines) between nearby objects. For instance, the shortest orthogonal path length between object 342 and 344 can be determined and presented as a proposed connection 346.

Proximity engine 336 can determine canvas 340 object proximity based on the object in focus (selected object). For instance, an object being moved can be identified and proximate objects can be determined based on relative position information (e.g., data 258). Engine 336 can be configured to analyze objects within a user specified distance to determine appropriate proposed connection(s). The user specified distance can be a threshold distance stored in configuration settings 338. In one embodiment, engine 336 can be configured to determine objects within a maximum and/or a minimum distance. In one embodiment, engine 336 can be temporarily configured to ignore user specified distance settings and determine proximate objects from all objects within the canvas 340.

Figure 4:
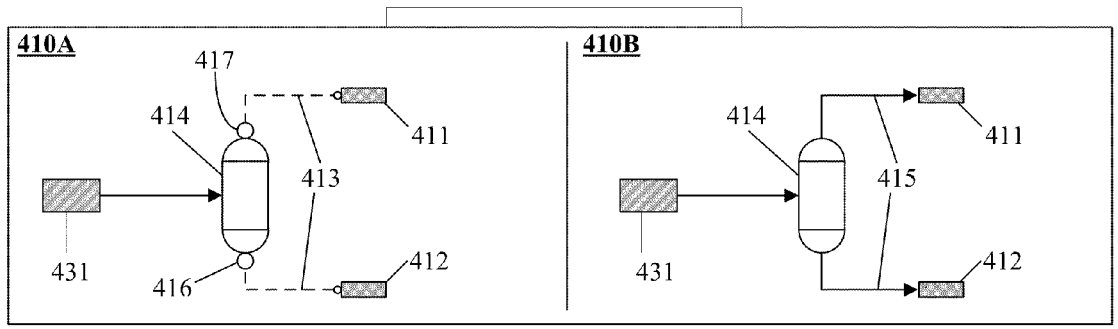
FIG. 4 is a schematic diagram illustrating a set of scenarios utilizing rapid manipulation of graphical representations of flowsheet models, according to an embodiment of the invention.
Figure 4:
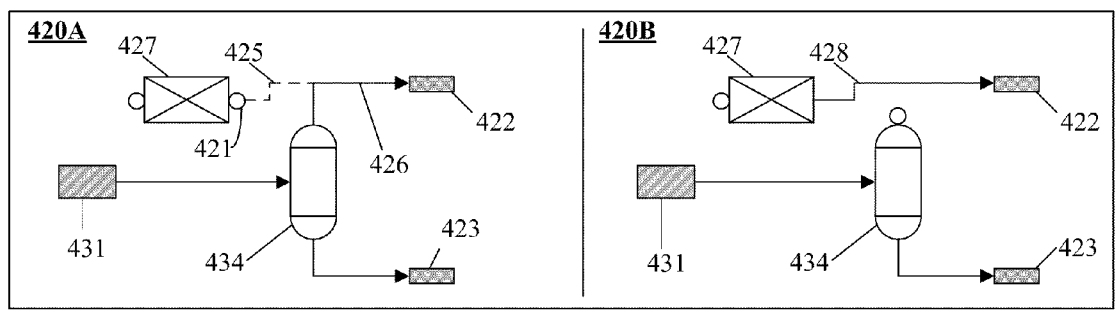
Figure 4:
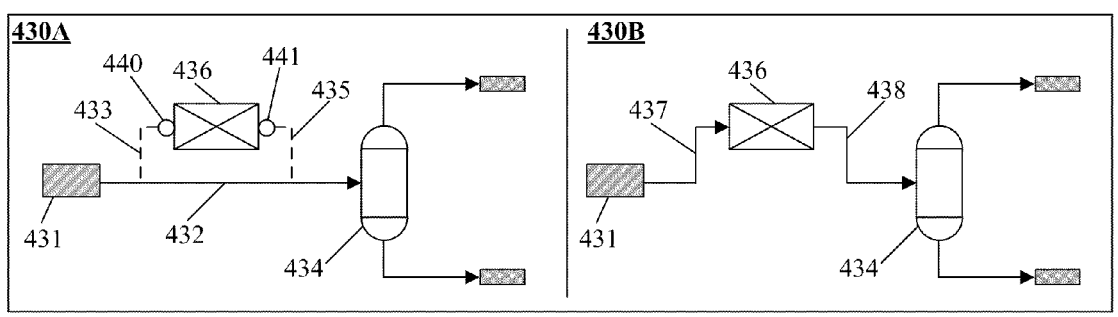

FIG. 4 is a schematic diagram illustrating a set of scenarios 400 utilizing rapid manipulation of connections for computer-rendered graphical flowsheets in accordance with embodiments of the invention. In scenarios 410A, 420A, 430A, flowsheets can be rendered for a user. The user can reposition objects 414, 427, and 436 in relation to other proximate objects. The repositioning action can result in proposed connections 413, 425, 433, and 435 being automatically presented in real-time to the user as the objects 414, 427, and 436 are moved. As such, the proposed connections 413, 425, 433, and 435 can be presented during the repositioning action enabling the user to visually determine the outcome of the action at any location for the objects. The proposed connections 413, 425, 433, and 435 can be determined based on the location and state of handles 416, 417, 421, 440, 441 in relation to proximate objects 411, 412, 422, 423, 431, 434.

Upon user confirmation of the proposed connections 413, 425, 433, 435, established connections 415, 428, 437 and 438, can be created. User confirmation can be detected based on one or more input device states. In one embodiment, a pointing device control (e.g. mouse button release) can be configured to end an object move action and trigger a user confirmation action. For instance, the completion of a drag and drop action can cause a proposed connection to be established. In another embodiment, a specified input (e.g., Enter key) can be setup to finish a move action and trigger a user confirmation action. The newly established connections 415, 428, 437 and 438 can update the relationships of the elements in the underlying process flow diagram model.

In scenario 410A, a user move action performed on graphical object 414 can trigger proposed connections 413 to be presented for objects 411, 412. Based on open connection handles 416, 417 proposed connections are determined for objects 411, 412. When the move action is completed, established connections 415 can be presented as shown in scenario 410B. Optionally, a single established connection 415 can be created for object 411 or 412 individually depending on user preferences, user input, and the like.

In one embodiment the proposed connections can be intelligently suppressed based on object properties. For instance, if proposing a connection between object 414 and object 412 creates a flow bottleneck as determined by rules 234 (shown in FIG. 2), then the proposed connection can be determined to be invalid and the proposed connection would not be visually presented.

In scenario 420A, a user moving object 427 to a proximity of object 422 can trigger proposed connection 425 to be presented. In one embodiment, proposed connection 425 can be presented in response to a keypress such as a modifier key (e.g. CTRL key) during a move action. Optionally, proposed connection presentation can be a default behavior. Upon release of the modifier key and/or completion of the move action, connection 426 can be removed and the proposed connection can be established as shown by connection 428 in scenario 420B. This behavior is advantageous in that two or more operations (e.g., delete and create) can be performed with one operation.

In scenario 430A, repositioning of object 436 between object 431 and object 434 can cause the proposed connections 433, 435 to be presented. The proposed connections 433, 435 can be established as shown in 430B when the user repositioning action is completed. As shown, the connection 432 can be removed and replaced with established connections 437, 438 based on handles 440, 441 position with respect to objects 431, 434.

Scenarios 410A-430B are for illustrative purposes only and should not be construed to limit this disclosure in any regard. Disclosed embodiments are not limited to the presented graphical objects and can be extended to any objects relevant to process flow diagram models. Proposed connections 413, 425, 433, 435 can be visually presented in a variety of ways which can include dashed lines, colored lines, overlays, and the like. Disclosed embodiments are not limited to the use of presenting and creating proposed connections via object handles. Proposed connections can be created between proximate faces of proximate graphical objects.

The flowchart and block diagrams in the FIGS. 1-4 illustrate the architecture, functionality, and operation of possible implementations of systems, methods and computer program products according to various embodiments of this Disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

What is claimed is:

1. A method for modification of a physical process topology shown on a flowsheet rendered by a computer, comprising: detecting a user initiated move action on a selected graphical object from a plurality of graphical objects which each represent devices effecting a physical process on said flowsheet within a rendered canvas of a graphical user interface, wherein said flowsheet includes said plurality of graphical objects interconnected to represent at least a portion of operations for said physical process; during said user initiated move action, based a predetermined threshold distance between said selected graphical object and others of said plurality of graphical objects, identifying candidate graphical objects from said others of plurality of graphical objects, wherein said identifying candidate graphical objects further comprises determining a compatibility including consideration of object function between said selected graphical object and others of said plurality of graphical objects that are within said predetermined threshold distance using rules including compatibility of associated element types which include not identifying ones of said others of plurality of graphical objects as candidate graphical objects when a connection to said selected graphical object would render said flowsheet unusable; provided at least one candidate graphical object is identified during said identifying, visually presenting at least one proposed connection between said selected graphical object and said candidate graphical object in a contrasting visual style to a style for established interconnections between said plurality of graphical objects within said rendered canvas; receiving a user confirmation action within said graphical user interface, wherein said user confirmation action confirms or rejects said proposed connection, and provided said user confirms said proposed connection, visually presenting a new established connection to replace said proposed connection using said style for established interconnections within said rendered canvas between said selected graphical object and said candidate graphical object.

2. The method of claim 1, wherein said user confirmation action is received from a peripheral input device coupled to said computer.

3. The method of claim 1, wherein said style for said established interconnections comprises solid line segments and said contrasting visual style for said proposed connection comprises at least one dashed line.

4. The method of claim 1, wherein when said identifying candidate graphical objects identifies a plurality of said candidate graphical objects and a plurality of said proposed connections are visually presented, and when said user confirmation action confirms said proposed connections a plurality of said new established connections are rendered on said canvas between said selected graphical object and said plurality of said candidate graphical objects to replace said proposed connections.

5. The method of claim 1, wherein said physical process comprises an industrial process comprising a plurality of fluid flows.

6. A system for user modification of a physical process topology on a flowsheet rendered by a computer, comprising: a processor; a proximity engine for identifying a candidate graphical object from a plurality of graphical objects on said flowsheet based on being within a predetermined threshold distance to a selected graphical object from said plurality of graphical objects while said selected graphical object is moved by a user on a rendered canvas, wherein said plurality of graphical objects each represent devices effecting a physical process, and wherein said flowsheet includes said plurality of graphical objects interconnected to represent at least a portion of operations for said physical process and wherein said identifying candidate graphical objects further comprises determining a compatibility including consideration of object function between said selected graphical object and others of said plurality of graphical objects that are within said predetermined threshold distance using rules including compatibility of associated element types which include not identifying ones of said others of plurality of graphical objects as candidate graphical objects when a connection to said selected graphical object would render said flowsheet unusable: a rendering engine for generating data for presenting connections including a proposed connection between said selected graphical object and said candidate graphical object in a contrasting visual style to a style for established interconnections between said plurality of graphical objects within said rendered canvas, and a display adapter for rendering said proposed connection, wherein provided said user confirms said proposed connection, said rendering engine generates data for a new established connection and said display adapter visually presents said new established connection to replace said proposed connection using said style for established interconnections within said rendered canvas between said selected graphical object and said candidate graphical object.

7. The system of claim 6, wherein when said identifying identifies a plurality of said candidate graphical objects and a plurality of said proposed connections are visually presented by said display adapter, and when said user confirms said proposed connections a plurality of said new established connections are rendered on said canvas between said selected graphical object and said plurality of said candidate graphical objects to replace said proposed connections.

8. The system of claim 6, wherein at least one of said rendering engine and said proximity engine is a component of an integrated development environment (IDE) software program.

9. A computer program product for user modification of a physical process topology shown on a flowsheet rendered by a computer, comprising:
   a non-transitory machine readable storage medium storing computer usable program code, said computer usable program code including: computer usable program code configured to detect a user initiated move action on a selected graphical object from said plurality of graphical objects on said flowsheet within a rendered canvas of a graphical user interface wherein said plurality of graphical objects each represent devices effecting a physical process, and wherein said flowsheet includes said plurality of graphical objects interconnected to represent at least a portion of operations for said physical process;
   computer usable program code configured to identify candidate graphical objects from said others of plurality of graphical objects during said user initiated move action based a predetermined threshold distance between said selected graphical object and others of said plurality of graphical objects and wherein said identify candidate graphical objects further comprises determining a compatibility including consideration of object function between said selected graphical object and others of said plurality of graphical objects that are within said predetermined threshold distance using rules including compatibility of associated element types which include not identifying ones of said others of plurality of graphical objects as candidate graphical objects when a connection to said selected graphical object would render said flowsheet unusable; computer usable program code configured to visually present at least one proposed connection that displays a temporary connection between said selected graphical object and said candidate graphical object in a contrasting visual style to a style for established interconnections between said plurality of graphical objects within said rendered canvas; computer usable program code configured to receive a user confirmation action within said graphical user interface, wherein said user confirmation action confirms or rejects said proposed connection, and computer usable program code configured to visually present a new established connection to replace said proposed connection provided said user confirms said proposed connection using said style for established interconnections within said rendered canvas between said selected graphical object and said candidate graphical object.

* * * * *